United States Patent [19]
Carlson et al.

[11] Patent Number: 5,127,802
[45] Date of Patent: Jul. 7, 1992

[54] REINFORCED FULL-SPAR COMPOSITE ROTOR BLADE

[75] Inventors: Charles E. K. Carlson, North Shallott, N.C.; John A. Violette, Granby, Conn.

[73] Assignee: United Technologies Corporation, Hartford, Conn.

[21] Appl. No.: 632,703

[22] Filed: Dec. 24, 1990

[51] Int. Cl.⁵ .............................................. B64C 11/00
[52] U.S. Cl. ........................... 416/226; 416/229 R; 29/889.71
[58] Field of Search ............... 416/226, 229 R, 230, 416/232, 241 A; 29/889.71

[56] References Cited

U.S. PATENT DOCUMENTS

| | | | |
|---|---|---|---|
| 2,767,461 | 10/1956 | Lebold et al. | 29/156.8 |
| 3,647,317 | 3/1972 | Furlong et al. | 416/226 |
| 3,713,753 | 1/1973 | Bronsch | 416/226 |
| 3,903,578 | 9/1975 | Rothman | 29/889.71 |
| 4,268,571 | 3/1981 | McCarthy | 416/229 R |
| 4,470,862 | 9/1984 | More et al. | 416/226 |
| 4,621,980 | 11/1986 | Reavely et al. | 46/226 |
| 4,648,921 | 3/1987 | Nutter, Jr. | 416/229 R |
| 4,806,077 | 2/1989 | Bost | 416/226 |
| 5,042,968 | 8/1991 | Fecto | 416/226 |

OTHER PUBLICATIONS

Mark's Standard Handbook for Mechanical Engineers, p. 11-102 (7th ed. 1978).

Primary Examiner—Edward K. Look
Assistant Examiner—Michael S. Lee

[57] ABSTRACT

A composite axial flow rotary machine blade (10) and method of blade construction is disclosed. A substantially full length composite spar (30) is spanwisely disposed within an airfoil planform (18) which supports an airfoil surface (11a). A pad of reinforcing fibers (40) is sandwiched between the spar's periphery and the airfoil surfaces' proximate inner surfaces (24a, b) corresponding to the pressure (22) and suction (24) sides of the airfoil planform in a spanwise distribution. A quantity of structural foam filler (50) is disposed through the balance of the blade's cavity (16).

11 Claims, 3 Drawing Sheets

CRITICAL SPEED DIAGRAM : PRIOR ART VS. IMPROVED ROTOR BLADE

REINFORCED FULL-SPAR COMPOSITE ROTOR BLADE

CROSS REFERENCE TO RELATED APPLICATION

Some of the subject matter disclosed herein is also disclosed in commonly owned copending U.S. Pat. application Ser. No. 07/633,566 filed on even date herewith by Charles Carlson and John Violette entitled "Composite Blade with Partial Length Spar".

DESCRIPTION

1. Field of the Invention

This invention relates generally to axial flow rotary machines and more particularly to a composite rotor blade for use in such machines.

2. Background of the Invention

Rotor blades are used in numerous axial flow rotary machine applications. Such blading typically operates at moderate to high angular speeds with tip speeds often extending into and beyond the transonic speed range, depending on the particular application. A rotor blade's ability to operate safely at high angular speeds increases the operational flexibility of the rotary machine as well as that of the aircraft in which it is installed. In addition, operation at increased angular speed range also provides additional performance attributes, such as improved thrust characteristics.

A rotor blade typically responds by vibrating when excited by cyclic airloads forcing it at or near one of its natural frequencies. The amplitude and type of deflection is responsive to the magnitude of the aerodynamic excitation as well as to the proximity of the exciting frequency to the blade's natural frequency and its corresponding mode of vibration. The blade may have, for example, a natural frequency with a deflection mode of bending or of torsion. For a given blade, several different modes of vibration may also occur within a given range of the blade's angular speed. A combination of similar or dissimilar modes may even couple together, particularly at certain angular speeds. Furthermore, a rotor blade can exhibit vibratory response when the blade's natural frequency coincides with an integer order multiple of an angular speed.

Vibratory input to the rotor blade may also originate at the rotary machine as well as from changes in a given flight regime, such as climb, descent, cruise, or landing attitudes. Instabilities such as bending or torsional flutter can also occur due to aerodynamic stall phenomena. These instabilities may occur at full power in soft blades whose bending and torsional resonant frequencies are relatively low. Furthermore, excessive deflection of the blade due to such vibration can result in damage to the blade.

Although a rotor blade's natural frequencies are routinely determined during its manufacture, a continuing challenge has been posed to scientists and engineers practicing in the art to design the blade's natural frequencies away from an optimum operating envelope. An improved blade with these desired qualities will be capable of operating within a wider angular speed range which is devoid of those excitation frequencies which can cause undesired blade vibratory deflection.

The natural and resonant frequencies of a rotor blade occur as a function of numerous design parameters, including bending and torsional stiffness characteristics, blade mass and its overall distribution, and means of blade attachment to the hub or disc and to the propulsion source.

A rotor blade's conceptual configuration is that of a twisted, tapered cantilever beam. The blade's bending frequencies are proportional to:

$$\sqrt{\frac{k}{m}}$$

where k is proportional to the blade bending stiffness distribution, or alternatively, proportional to EI, which is the product of the material average modulus of elasticity and the bending moment of inertia of a cross-section of the blade about a neutral axis, and blade mass.

Torsional frequency is dependent on blade torsional stiffness distribution, which includes the mass contribution from the leading and trailing edges of the blade. Given the tapered nature of a blade, the inboard regions tend to be torsionally stiff relative to the outboard regions. This outboard torsional stiffness relative to the outboard edge mass thereby controls the blade's first torsional mode.

In particular, a specific vibratory response of the blade at a specific resonant frequency may be identified as one of several specific modes of vibration. These modes may have flatwise, edgewise, and/or torsional bending characteristics and are typically labeled as 1F (first flatwise), 2F (second flatwise), 1E (first edgewise), 1T (first torsional), etc. The strongest vibratory responses of blades in open rotors, such as propellers, tend to occur with the more basic primary modes of vibration at the lowest integer multiples of operating speed.

The rotor blade must also be capable of accommodating other internally and externally generated stresses, including centrifugal forces, shock, contact with foreign objects, and stress concentrations intrinsic to rotor blade geometry. It is necessary that the rotor blade accommodates these stresses at operating speeds.

Given these fundamental design considerations, it is apparent that a relatively lightweight but stiff rotor blade construction will increase a rotor blade's natural frequency and its harmonic resonances, thereby avoiding possible low integer order resonances and allowing for increased range in rotary propulsor speeds.

SUMMARY OF THE INVENTION

It is an object of the present invention to provide a new composite rotor blade with an increased natural frequency which allows for an increased rotor blade operating speed range.

It is yet another object of the present invention to provide a relatively lightweight rotor blade with high bending stiffness and high torsional stiffness characteristics.

These and other objects will become apparent in the further course of this disclosure.

The present invention provides a composite rotor blade with increased natural frequencies and with enhanced bending and torsional stiffness characteristics in a relatively lightweight configuration.

A spanwisely-disposed internally located full-length hollow spar, which may consist of angularly oriented fibers, about which an airfoil surface is disposed defines the basic structure of the new blade. Pads of reinforcing graphite fibers, immersed in a resinous matrix, are selectively and spanwisely disposed between the spar's outer periphery and the airfoil surface's corresponding inner periphery, relative to the blade's pressure and suction surfaces, to provide additional bending strength and stiffness to the assembly. Low-density closed-cell foam filler is disposed throughout the balance of the blade's interior to improve dimensional stability and facilitates manufacture. The resulting structure combines the bending stiffness improvements provided by the graphite fiber pads' anisotropic fiber orientation with the torsional stiffness advantages of the angularly oriented fibers in the full length spar to achieve an improved rotor blade design with an increased operating speed range.

This invention provides significant advantages over the related art. One such advantage is the increased range of rotor blade operating speeds between those vibratory modes which can cause dynamic instabilities, subject to a particular engine/rotor blade or engine/propeller configuration. Another advantage is the increased torsional stiffness of the present invention which delays the onset of torsional stall flutter, and allows for greater power and torque capacity, resulting in greater load and thrust-bearing capabilities of the rotor blade.

DETAILED DISCLOSURE

Figure 1:
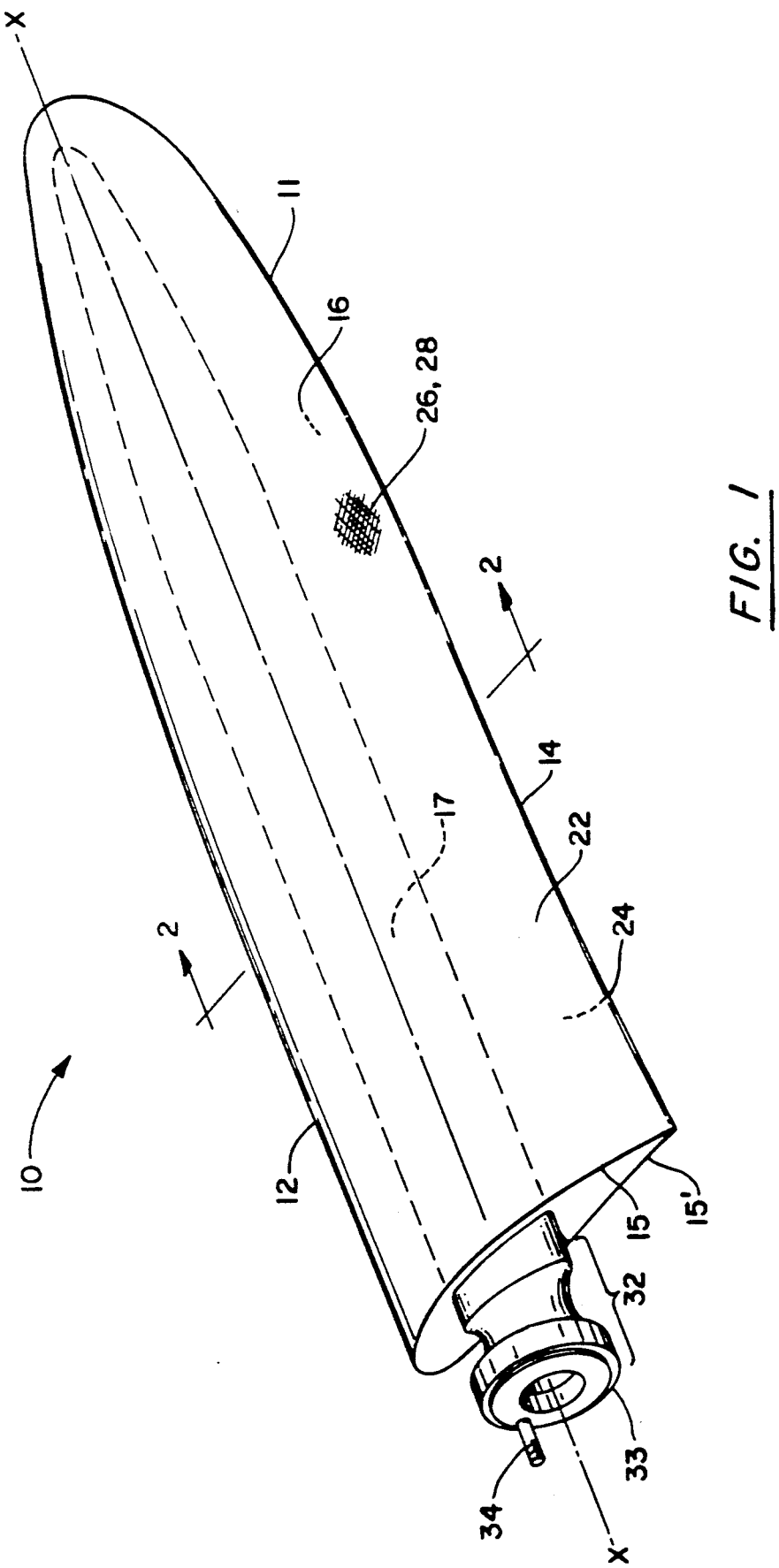
FIG. 1 is a perspective view of a full-spar composite rotor blade used in an axial flow rotary machine, according to the present invention.

Referring to FIG. 1, the invention shown is a composite rotor blade generally illustrated by numeral 10 and is intended for use in an axial flow rotary machine.

The composite rotary machine blade 10 has a full length spar 30 spanwisely disposed within a hollow cavity 16 defined by the structure of an airfoil planform 11. The airfoil planform 11 has a pressure side 22, a suction side 24, the sides meeting at a leading edge 12, a trailing edge 14 and at side edges 15, 15'. The pressure and suction sides 22, 24 of the airfoil planform 11 are constructed of a fiberglass cloth 26 embedded in an epoxy resin matrix 28.

The cloth weave 26 generally consists of filaments of fiberglass or the like directionally oriented at about ±45 degrees to the blade spanwise axis X—X. The cloth weave of these filaments is then subjected to resin injection under controlled conditions of pressure and temperature. The resulting laminate offers a number of benefits, including enhanced blade stiffness in bending and torsion when the fibers of the laminate are oriented accordingly, as will be more fully described below, thus resulting in high strength to weight ratios, and achieving lower blade weight for given power and torque capacity.

Figure 2:
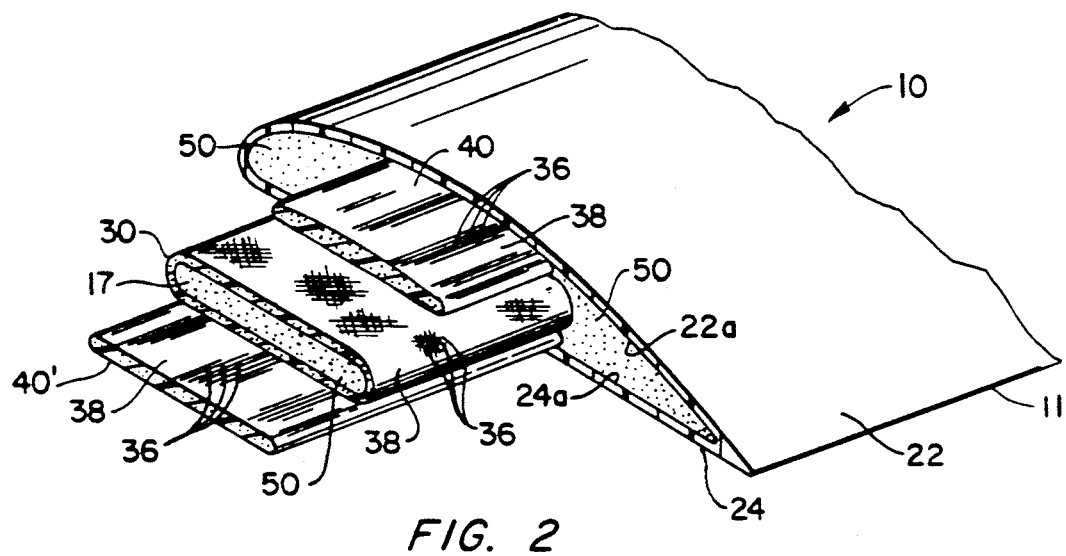
FIG. 2 is an exploded view of the rotor blade of FIG. 1 taken on the line 2—2 of FIG. 1.

The spar 30, has a proximal end 32 that provides a flange 33 and a pitch change member 34 for attachment to the hub (not shown) and pitch change actuator (not shown), respectively. According to the invention, the spar 30 extends substantially the full spanwise length through the hollow blade cavity 16 of the rotary machine blade 10, the spar 30 fully circumscribing an axially disposed cavity 17. Referring to FIG. 2, the spar 30 may be constructed of composite materials, such as graphite fibers 36 embedded in a resinous epoxy matrix 38. These graphite fibers 36 are anisotropically oriented in a cross-plied direction substantially at ±45 degrees to the longitudinal axis X—X of the blade and are embedded within the resinous epoxy matrix 38 so as to maintain that orientation. The fibers may be angularly wound, wrapped as a cloth, and/or pre-braided as a tube and slid over the foam core. The high stiffness fibers, oriented angularly in the closed perimeter spar, provides some torsional stiffness to the blade, as well as a shear path to accommodate bending loads between pressure and suction surfaces.

Alternatively, the spar 30 may be constructed of a high-strength, light-weight metal or an alloy thereof from the family including, but not limited to, aluminum, steel, or titanium. The spar's shape may be further tailored to compliment the blade's desired finished shape, aerodynamic loading, or other parameters.

Also relevant to an embodiment of this invention is the cavity 17 contained within the spar 30 in which structural foam filler is disposed, as will also be further described.

Again referring to FIG. 2, an exploded view of the composite rotary machine blade 10 is disclosed. Graphite epoxy pads 40, 40', which are more fully described below, are sandwiched between the periphery of the spar 30 and the inner surface 22a, 24a of the airfoil planform 11 corresponding thereto. The inner surfaces 22a, 24a of the planform 11 contact the respective pads 40, 40'. The reinforcing fibers 36, of the graphite epoxy pads 40, 40', which are embedded in a resinous epoxy matrix 38, are oriented in a direction substantially parallel to the longitudinal axis X—X of the blade 10. These reinforcing fibers 36 are typically graphite with strong anisotropic properties necessary for bending control. In general, an equal number of graphite epoxy pads 40 are evenly distributed to the relatively flat pressure/suction sides 22, 24 of the blade 10. Alternatively, even material distribution may be achieved by properly apportioning the volumetric fiber bulk of the graphite epoxy pads 40 to either relatively flat side 22, 24 of the blade 10. Conversely, unequal apportionment of the necessary fiber bulk may be desirable in the construction of a cambered airfoil. That is, uneven apportionment of the fiber bulk in that application may be necessary to accommodate an intrinsic warpage factor of the blade.

Figure 3A:
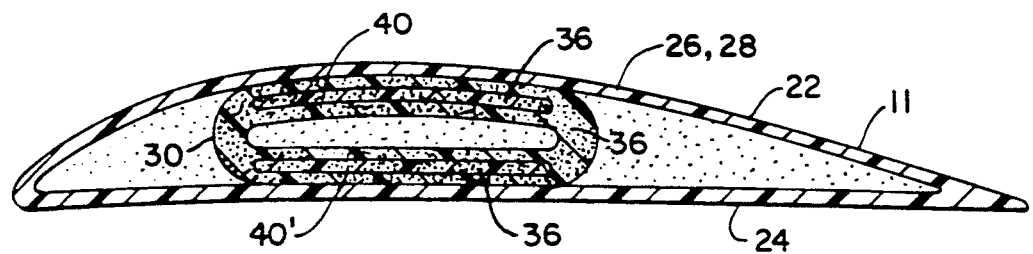
FIG. 3a and 3b show cross-sections of alternate embodiments of the rotor blade according to the present invention.
Figure 3B:
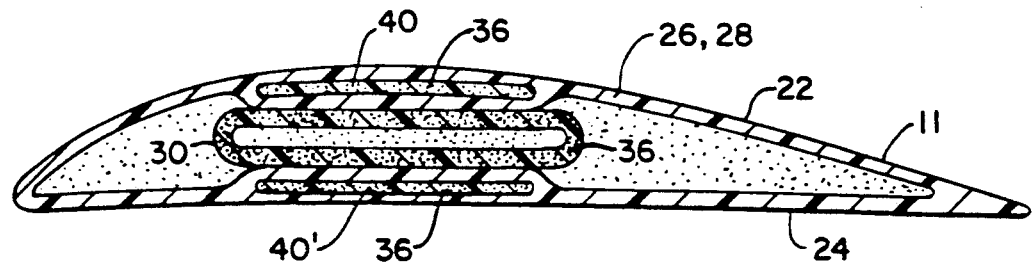

In addition, and according to another embodiment of the invention, shown in FIG. 3a, the graphite pads 40, 40' may be embedded in a spanwisely oriented spaced relationship within a plurality of graphite fibers 36 comprising the composite spar 30. Yet in another embodiment of this invention, shown in FIG. 3b, the graphite pads 40, 40' are embedded within a plurality of layers of fiberglass cloth 26 which comprise the pressure and suction sides 22, 24 of the planform 11. These two embodiments are shown, in cross-section, in FIG. 3a, and FIG. 3b, respectively.

According to the present invention, the blade's torsional qualities may be tuned independently of its bending stiffness characteristics. This is due to the anisotropic orientation of the graphite fibers contained within the spar 30 and the graphite pads 40, 40'. Graphite's high strength properties provide important advantages to the resulting structure. Two such important structural advantages are enhanced yield strength and tensile strength resulting from selective orientation of the graphite fiber 36. In addition, combining the graphite fiber based spar and pads with the outer laminated airfoil shell 20 utilizing the aforementioned laminate construction provides for yet additional yield and tensile strength enhancement.

In the embodiment of this invention shown in FIG. 2, a hollow cavity 17 is provided in the spar 30. Structural foam filler 50 is disposed in this cavity 17. Typically, this foam filler 50 has a low density, closed-cell structure, which improves dimensional stability of the blade airfoil cross-sections, resisting buckling, while facilitating manufacturing by providing a mandrel 1 upon which to layup the spar and shell composite material. Use of such foam construction provides for a low density light-weight and rigid construction of the blade 10. Structural foam filler 50 may also be disposed in the void remaining between the inner surfaces 22a, 24a and the spar 30 and/or graphite pads 40, 40' of the blade.

As discussed above, an important problem in the current art is the need for a new design for a composite rotor blade which increases the allowable rotor blade operating speed range. The major impediment to this desirable but heretofore unavailable improvement is the existence of a rotor blade's natural frequencies within or near the operating range of current conventional rotor blade designs.

The natural frequency of vibration of the blade increases with increasing spar and blade stiffness and with decreasing weight of the propeller blade 10. This frequency of free vibration of a rotor blade is called its natural frequency. When the frequency of a forced vibration such as the periodic fluctuations encountered by a rotating rotor blade approaches its natural frequency, the resulting amplitude of vibration may build up to a dynamically unstable value. This condition is known as resonance.

Figure 4:
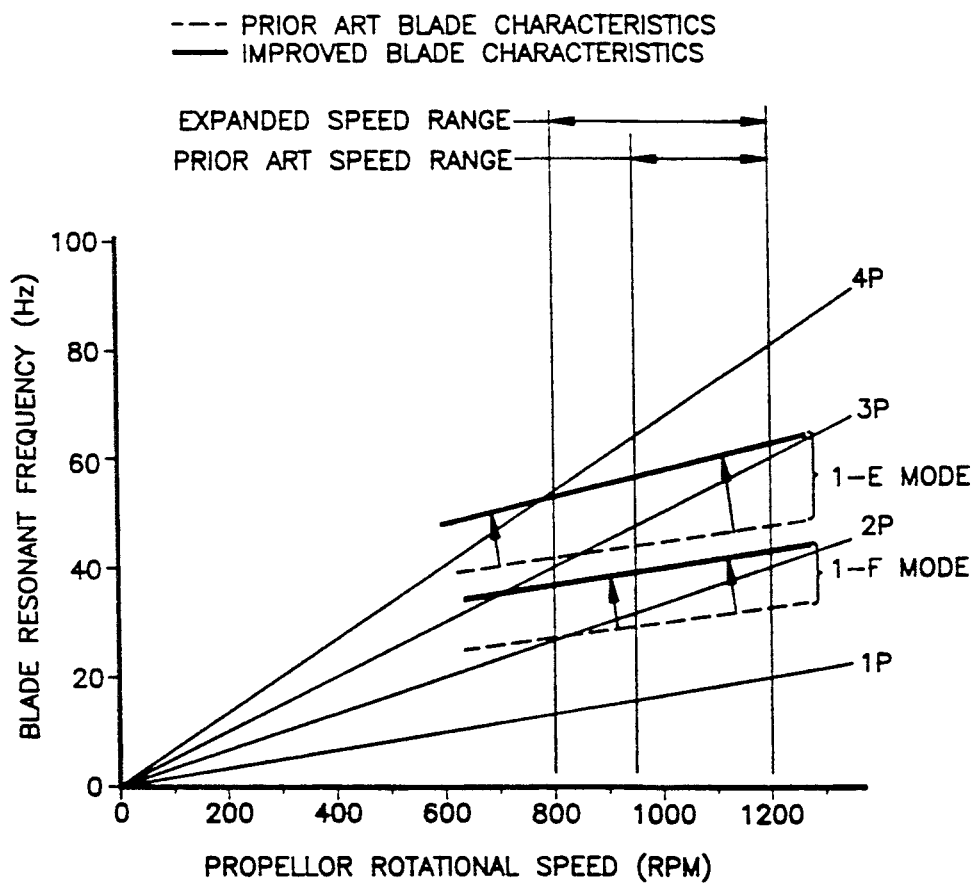
FIG. 4 shows the correlation between a range of rotor blade excitation frequencies and a representative range of rotor blade operating speeds for a prior art blade and a blade constructed in accordance with the present invention.

In general, a rotor blade rotating at a given angular speed may resonate at an excitation frequency corresponding to its natural frequency. Characteristic resonant modes include torsional, edgewise, or flatwise bending of the blade at speed as previously discussed. FIG. 4 depicts a typical distribution of two resonant modes occurring over a representative operating angular speed range for a given rotor blade. More specifically, increasing the natural frequency of the individual rotor blades enables a wider operating speed range without encroachment upon one or more of the integer order cross-overs of operating speed 1P, 2P, 3P represented in FIG. 4. For example, a typical prior art rotor blade is restricted to a fully operational speed range of approximately 950 rpm to 1200 rpm so as to avoid those resonant frequencies corresponding with, for example, first mode flatwise and second mode edgewise resonant crossovers, graphed as 1F and 1E, respectively. In marked contrast, the rotor blade of the current invention provides a broadened fully operational speed range of approximately 800 rpm to 1200 rpm without encountering the aforementioned resonant crossovers. It will be appreciated by those skilled in the art that a particular blade resonant mode uniquely corresponds with a specific rotor configuration (in terms of its structure and composition) and the rotor resonant modes associated therewith relative to the intended operating speed range.

From the above discussion, it is therefore apparent that selective alteration of the natural frequency of a given rotor blade 10 allows the blade to operate within an expanded operating speed range without chancing an unintended excursion into the realm of a particular blade resonant mode. For example, this invention provides for an increase of the rotational first bending frequency above the operating speed range such that any first bending mode resonances occurring at that 2P excitation will not induce significant stress levels in the rotor blade 10. A given distribution of blade resonant modes may be modified by the distribution of the graphite epoxy pads 40, 40' proximate to the pressure and/or suction sides 22, 24 of the composite blade 10. In a like manner, the natural frequency of the composite rotor blade 10 may be tuned by altering the thickness and width of the graphite epoxy pads 40, 40'. Additional tuning may also be accomplished by varying the thickness, composition, and angular orientation of the fibers in the composite spar 30 and even by varying the construction and composition of the laminated airfoil shell 20, as may be determined by those skilled in the art, thereby selectively achieving a desired natural frequency and its resonances for a given rotor blade.

Although the invention has been shown and described with respect to the detailed embodiments thereof, it should be understood by those skilled in the art, that various changes in form and detail thereof may be made without departing from the spirit and scope of the claimed invention.

We claim:

1. In a composite rotary machine blade extending a given length from a hub, the blade having an airfoil planform having pressure and suction sides, the planform defining a hollow cavity, the blade further having a spar spanwisely disposed within the cavity, the improvement comprising:
 a pad having a plurality of reinforcing fibers sandwiched between the spar's periphery and the planform's radially proximate inner surface corresponding to a side of the planform.

2. In a composite rotary machine blade extending a given length from a hub, the blade having an airfoil planform having pressure and suction sides, the planform defining a hollow cavity, the blade further having a spar spanwisely disposed within the cavity, the improvement comprising:
 a pad having a plurality of substantially parallel reinforcing fibers imbedded in a resinous epoxy matrix, the pad being sandwiched between the spar's periphery and the planform's radially proximate inner surface corresponding to a side of the planform, the reinforcing fibers of the pad oriented substantially parallel to the spar.

3. The blade of claim 2, wherein the spar extends a substantially spanwise length through the cavity.

4. The blade of claim 2, wherein the spar is hollow.

5. The blade of claim 4, wherein a quantity of foam filler is disposed within the spar.

6. The blade of claim 2, wherein a quantity of foam filler is disposed within the planform's cavity and without the spar.

7. The blade of claim 5, wherein the foam filler comprises low-density, closed-cell foam.

8. The blade of claim 2, wherein the pad is spanwisely disposed radially inwardly of the spar's periphery corresponding to a side of the planform.

9. The blade of claim 2, wherein the pad is spanwisely disposed radially outwardly of the planform's radially proximate inner surface corresponding to a side of the planform.

10. In a composite rotary machine blade extending a given length from a hub, the blade having an airfoil planform having pressure and suction sides, the planform defining a hollow cavity, the improvement comprising:
- a spar extending substantially the full spanwise length of the cavity, the spar having a second cavity contained therein, and a quantity of foam filler disposed in said second cavity,
- a pad having a plurality of substantially parallel reinforcing fibers imbedded in a resinous epoxy matrix, the pad being sandwiched between the spar's periphery and the planform's radially proximate inner surface corresponding to a side of the planform, the reinforcing fibers of the pad oriented substantially parallel to the spar, and,
- a quantity of foam filler disposed in the remaining void of the planform.

11. A method for the manufacture of a composite rotary machine blade having an airfoil planform having a pressure side and a suction side, the blade further having a spanwisely oriented spar extending a given length between the sides from a hub, comprising the steps of:
- layering a pad of reinforcing fibers upon a spanwisely extending spar-face, and
- forming the airfoil planform about the combination of the above step to form a spar-face-pad-planform sandwich proximate to a side of the airfoil planform.

* * * * *